United States Patent [19]

Gleason et al.

[11] 4,322,392

[45] Mar. 30, 1982

[54] SO₂ SCRUBBING SYSTEM FOR FLUE GAS DESULFURIZATION

[75] Inventors: Robert J. Gleason, Edison; Mark Richman, South Bound Brook; Paul E. Cooke, Titusville, all of N.J.

[73] Assignee: Research-Cottrell, Inc., Somerville, N.J.

[21] Appl. No.: 176,796

[22] Filed: Aug. 11, 1980

Related U.S. Application Data

[63] Continuation of Ser. No. 25,577, Mar. 30, 1979, abandoned.

[51] Int. Cl.³ .............................................. C01B 17/00
[52] U.S. Cl. .................................. 423/242; 423/166; 423/512 A
[58] Field of Search .......... 423/242 A, 242 R, 244 D, 423/244 R, 512 A, 166

[56] References Cited

U.S. PATENT DOCUMENTS

| T890,008 | 9/1971 | Slack et al. | 423/242 |
|---|---|---|---|
| T909,017 | 4/1973 | Jordan et al. | 423/242 |
| 2,113,198 | 4/1938 | Nonhebel et al. | 423/242 |
| 3,396,514 | 8/1968 | Hurst et al. | 55/27 |
| 3,632,306 | 1/1972 | Villers-Fisher et al. | 423/242 |
| 3,648,440 | 3/1972 | Egan | 55/226 |
| 3,728,433 | 4/1973 | Urban | 423/242 |
| 3,768,234 | 10/1973 | Hardisan | 55/223 |
| 3,785,119 | 1/1974 | McIlvaine | 55/7 |
| 3,795,486 | 3/1974 | Ekman | 23/283 |
| 3,903,243 | 4/1975 | Atsukawa et al. | 423/166 |
| 3,958,691 | 5/1976 | Schaeffer | 206/326 |
| 3,995,006 | 11/1976 | Downs et al. | 423/244 |
| 4,250,132 | 2/1981 | Biedell et al. | 423/242 |

OTHER PUBLICATIONS

Key Technical Issues of SO₂ Scrubbing, vol. 1, 1976, vol. 2, 1976, vol. 3, 1976, vol. 4, 1977, vol. 5, 1977, vol. 6, 1977.

Primary Examiner—Helen M. McCarthy
Assistant Examiner—Gregory A. Heller
Attorney, Agent, or Firm—Kerkam, Stowell, Kondracke & Clarke

[57] ABSTRACT

Sulfur dioxide is scrubbed from boiler flue gases in a double-loop alkali scrubber, one a quencher loop and the other an absorption loop. The reagent flow of the two loops is isolated so that none of the reagent from the quencher loop is cycled to the absorber loop and a portion of the make-up water for the quencher loop is received from the absorber loop. By controlling recycled water from a dewatering system and selective utilization of high and low solids streams from the absorber system, the quencher slurry concentration may be controlled and the requirement for new make-up water reduced. The two loop process isolates the main absorber system including the demisters, which are prone to scaling and corrosion, from the evaporative quencher portion of the process. All the recycled water is returned to the evaporative quencher loop and none to the loop controlling the demisters and the primary absorber sections. However, under varying SO₂ feed rates, the recycled water to the quencher loop may be in excess or insufficient for the evaporative material balance of the quencher loop. To compensate for either imbalance, it is necessary to utilize a separator and flow control between the two loops to decrease or increase the water balance flow to the quencher loop while maintaining the absorber loop at the proper operating balance.

20 Claims, 2 Drawing Figures

SO₂ SCRUBBING SYSTEM FOR FLUE GAS DESULFURIZATION

This application is a continuation, of application Ser. No. 025,577, filed Mar. 30, 1979, now abandoned.

DESCRIPTION

Cross-Reference to Related Applications

Related subject matter is disclosed and claimed in U.S. patent application Ser. No. 957,674, filed Nov. 6, 1978, for SULFUR DIOXIDE SCRUBBER WITH HYDROCLONE SEPARATOR—Biedell et al.

Technical Field

This invention is directed to a unique double-loop $SO_2$ scrubbing system for flue gas desulfurization which optimizes use of make-up water while controlling slurry concentration for $SO_2$ scrubbing efficiency and quenching.

Background of Prior Art

Scrubbing of boiler flue gases with slurries of limestone ($CaCO_3$) or calcined limestone products, lime and hydrated lime, is a known method for the removal of sulfur dioxide ($SO_2$) from these combustion gases. The standard system does, however, require significant amounts of make-up water for operation and therefore increases the total plant requirements for water. As suitable quality water is often available to the plant only in limited quantities, it is essential that the scrubbing system use a minimum of high quality make-up or re-used water.

Make-up water is required in sulfur dioxide scrubbing 25 systems to replace water lost principally in two areas: (1) water lost through evaporation by the quenching and lowering the temperature of flue gases passing into the scrubber; and (2) water lost with the discharge of the solid waste product composed of a slurry of unreacted reagent, calcium sulfite hydrates and calcium sulfate hydrates that are discharged from the system. The total make-up water requirements for the system can, therefore, be minimized by reducing these water losses.

Generally, make-up water is utilized in the sulfur dioxide scrubbing system in several areas: (1) water entering with the reagent in the form of a slurry: (2) water for slurry pump and agitator packing glands; (3) wash water to remove solids that have built up on impingement-type demisters; (4) quencher make-up water, which replaces most of the evaporative losses incurred in lowering the gas temperature. Most of the make-up water is introduced into the system either as demister wash water or quencher make-up water. The water used as demister wash water must be of sufficiently high quality, that is, low solids and reduced impurities, so as not to contribute to the solids buildup on the demisters that is designated to wash away. Its solids content and pH must be kept within limits. The quencher make-up water, on the other hand, can be of considerably lesser quality.

One prior art method for minimizing system water losses, i.e., process make-up water requirements, is to operate the scrubbing system in a closed loop manner. In closed loop operation, the discharge slurry from the absorber or scrubbing system is partially dewatered to generate two new streams: a high solids stream that is sent to disposal; and a low quality water stream that is recycled to the scrubbing system.

Utilization of this recycled water can reduce the overall process fresh makeup water requirements by up to 50%. However, the recycled water is saturated in sulfates which increase the potential for scaling in the absorber and demister systems. In addition, impurities including corrosive chlorides become concentrated within the absorber during closed loop operation. These impurities require the use of expensive materials of construction and often preclude closed loop operation in single loop desulfurization systems.

Further, to effect proper absorption and scale control in a calcium based, flue gas $SO_2$ removal system, the limits of operating conditions must be controlled within a specified range.

BRIEF SUMMARY OF INVENTION

Applicants have discovered that by controlling recycled water from a dewatering system and selective utilization of high and low solids streams from the absorber system, the quencher slurry concentration may be controlled and the requirement for new make-up water reduced. The two loop process isolates the main absorber system including the demisters, which are prone to scaling and corrosion, from the evaporative quencher portion of the process. All the recycled water is returned to the evaporative quencher loop and none to the loop containing the demisters and the primary absorber sections. However, under varying $SO_2$ feed rates, the recycled water to the quencher loop may be in excess or insufficient for the evaporative material balance of the quencher loop. To compensate for either imbalance, it is necessary to utilize a separator and flow control between the two loops to decrease or increase the water balance flow to the quencher loop while maintaining the absorber loop at the proper operating balance. Normally, the slurry composition should be controlled to allow greater than 3% reaction products of combined calcium sulfite and calcium sulfate in the quencher loop. Further, to achieve an effective absorption of sulfur dioxide, the calcium base must be maintained above a minimum level. Typically, an absorber operates between 6% to 14% solid content.

The two loop process then, permits the operation of the demisters and the primary absorber sections in a complete open loop, whereupon contaminated recycled water is avoided and use of additional demister wash water is maximized. Eliminating recycled water in these sections reduces the encrustations, scale formation and uncontrolled crystallization which hampers continuous operation of the $SO_2$ removal system. This also permits the use of less expensive materials which would be required to prevent attack by dissolved chemicals such as chlorides.

The use of recycled water from the dewatering system in the second loop, namely the quencher section, permits the operation of the total system in a closed loop such that all the water available is utilized in the process rather than being disposed.

BRIEF DESCRIPTION OF DRAWINGS

The invention will be more particularly described in reference to the drawings wherein.

DETAILED DESCRIPTION OF INVENTION

Figure 1:
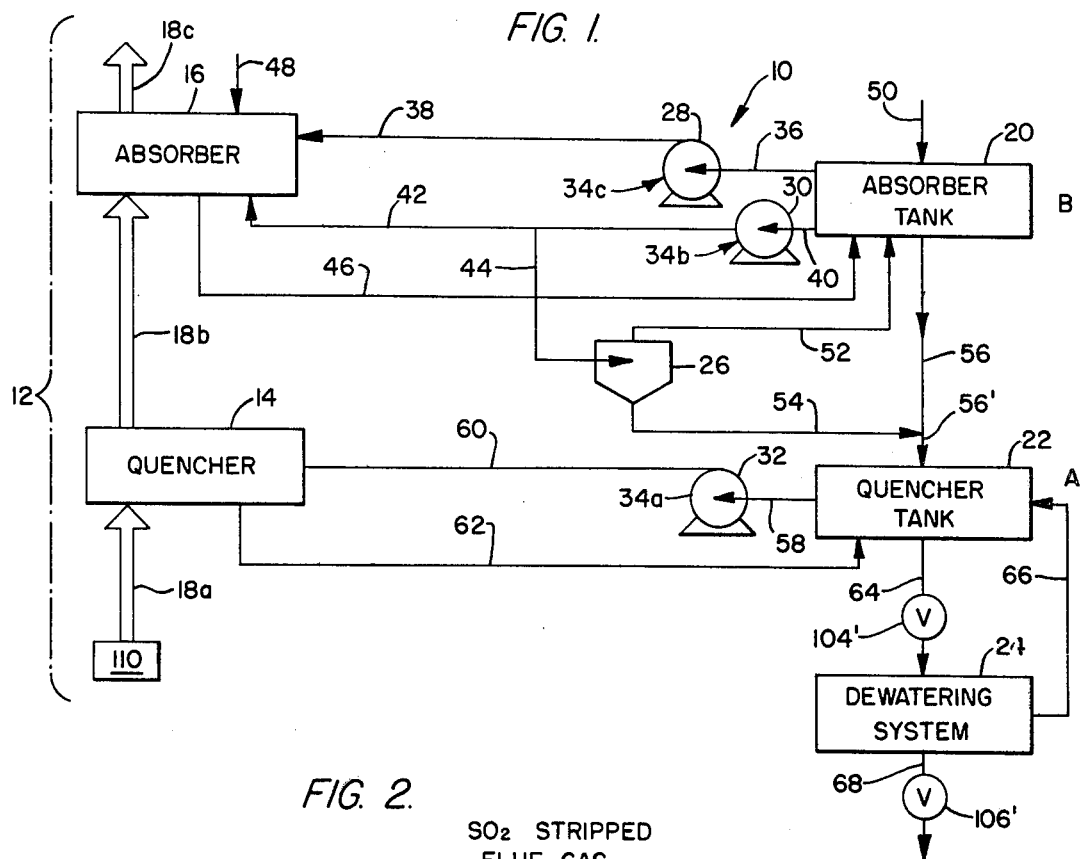
FIG. 1 is a simplified flow diagram of the system.
Figure 2:
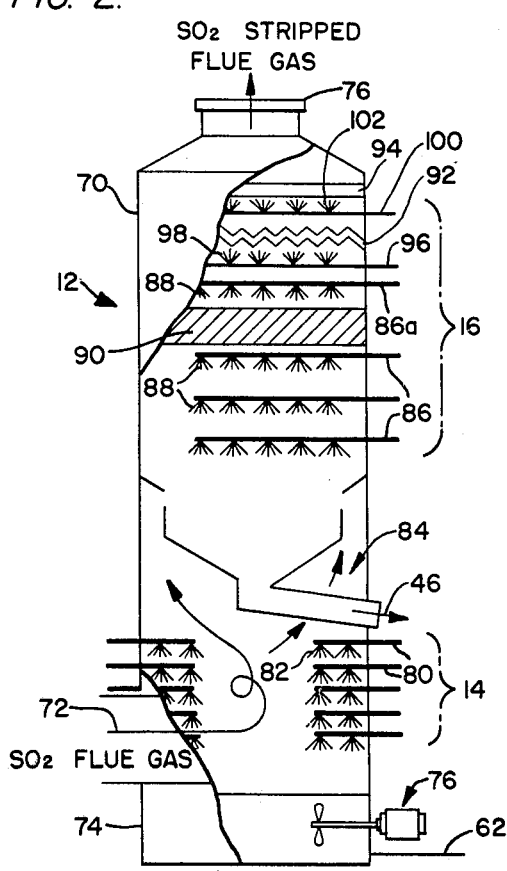
FIG. 2 is a partial sectional diagrammatic view of a multi-stage quencher-absorber tower useful for carrying out the system of the invention.

Referring to FIG. 1 of the drawings, 10 generally designates a system of the invention and the system includes a multiple-stage quencher-absorber tower 12, to be more fully described in reference to FIG. 2, which includes a quencher 14 and an absorber 16.

Arrows 18a, b and c designate, respectively, the gas flow to the quencher 14, gas flow from the quencher 14 to the absorber 16 and the $SO_2$ stripped flue gas from the absorber 16.

Other primary components of the system include absorber tank 20, quencher tank 22, dewatering system 24, an absorber separator 26, pumps 28, 30, and 32, each of which has a pump seal water inlet designated 34a, b and c for pumps 32, 30 and 28 respectively.

The primary liquid/slurry lines for the system are: line 36 from the absorber tank 20 to pump 28; line 38 comprising the primary absorber feed line from the pump 28 to the absorber 16; secondary absorber feed line 40 from absorber tank 20 to pump 30; secondary absorber feed line 42 from pump 30 to absorber 16; line 44 comprising a branch of line 42 from the secondary absorber feed to the absorber separator 26; line 46 from the absorber 16 to the absorber tank 20, the demister wash water line 48 for the multi-stage quencher-absorber tower 12; line 50 the reagent feed line for absorber tank 20; exit line 52 from the absorber separator 26 to absorber tank 20; exit line 54 from the absorber separator 26; absorber tank 20 overflow line 56 to the quencher tank 22; line 58 from quencher tank 22 to pump 32; line 60 comprising the quencher feed line from pump 32 to the quencher 14; quencher return line 62 from quencher 14 to quencher tank 22; line 64 comprising the discharge from the quencher tank 22 to the dewatering system 24; line 66 from the dewatering system 24 to the quencher tank 22; and line 68 comprising the dewatering system blow down line from dewaterer 24.

Referring now to FIG. 2, the multi-stage quencher-absorber tower 12 has a vertically extending shell 70 with a flue gas inlet 72 adjacent at the lower and a $SO_2$ stripped flue gas outlet 73 at the upper end. Below the flue gas inlet 72 is a sump 22 or quencher tank provided with a sump stirring mechanism generally designated 76.

In FIG. 2, the quencher section is generally designated 14 and the absorber section is generally designated 16. The quencher section includes a plurality of headers 80, which would be connected to line 60 from the pump 32, with each of the headers being provided with a plurality of spray outlet nozzles 82. In a preferred embodiment, the quencher section 14 is of the cyclonic type as the flue gases entering inlet 72 are caused to flow tangentially upwardly. Return line 62 depicted in FIG. 1 is the return by gravity of the treating fluid from the headers 80 to the quencher tank 22.

Between the quencher section 14 and the absorber section 16 is a gas/liquid bowl separator generally designated 84. This separator 84 collects the water from the demister and the slurry fluid from the absorber and the collected fluid is directed from the separator 84 for return to the absorber tank, via line 46. Above the bowl separator 84 are a plurality of headers designated 86 and 86a each having connection to lines 38 and 42 comprising the primary and secondary absorber feed lines.

Each of the headers 86 and 86a is provided with a plurality of spray type outlet nozzles 88 and between the headers 86 and 86a is a conventional packed tower arrangement 90. Above the header 86a is arranged lower demister 92 and upper demister 94. Wash water for the lower demister is provided via header 96 having spray type outlets 98. The upper demister 94 is also provided with a wash water means including a header 100 provided with spray type outlets 102.

The absorber separator 26 and the dewatering system 24 designated in FIG. 1 may take form of hydroclones, thickeners, centrifuges or vacuum filters.

Referring again to the drawings of the present invention, the two-loop system includes a quencher loop A wherein almost all of the evaporative water losses occur, and an absorber loop B (which includes the demisters 92–94), wherein gases pass first through the quencher loop, then through the absorber loop. Reagent flow is counter-current to the gas flow, passing first through the absorber loop. Solids are removed from the system as follows. Solids products of the reaction between the calcium based reagent and sulfur dioxide, as well as some unreacted reagent, are fed from the absorber tank 20 of the absorber loop B to the quencher loop A along with some water through line 56 at rather constant concentration. Slurry is also fed to loop A by line 44, absorber separator 26 and line 54. The solids are then circulated throught the quencher loop A wherein more reaction products are formed as the concentration of unreacted reagent decreases. The solids are then discharged from the quencher to the dewatering system 24 and ultimate waste disposal.

Make-up water enters the absorber loop as (1) water entering with the reagent at 50; (2) small amounts of water for slurry pump packing glands at 34c and b; and (3) demister wash water at 48. Make-up water enters the quencher loop as: (1) small amounts of fresh make-up water for slurry pump and agitator packing glands at 34a and 34d, respectively; (2) quencher make-up water (recycled water) at 66, which replaces most of the evaporative losses; and (3) water accompanying the absorber loop discharge solids at 56'.

When the process requirement for quencher make-up water is satisfied by the recycled water generated by the sludge dewatering system and the absorber loop discharge, optimum water utilization is achieved. However, the process requirement for quencher make-up water is directly related to the volume of flue gas treated, and the concentration of sulfur dioxide in the gas. Therefore, there is only one precise sulfur dioxide concentration for any given treated gas volume for which the process requirement for quencher make-up water equals the recycled water or slurry available for return to the process. There are many operating conditions when the recycled water and absorber loop discharge available exceeds or is less than the quencher make-up water requirement.

Where the recycled water generated exceeds the quencher make-up water requirement, the concentration of solids in the absorber loop discharge slurry must be increased. This is accomplished by standard controls at the absorber separation 26 which directs the high solids stream containing solids content in the range of 10% to 50% to flow through line 54 to mix with the slurry flowing through line 56 while the low solids stream containing solids content in the range of 3% to 10% is to be returned to the absorber tank 20. The absorber loop then operates as an open system discharging high solids content slurry into the quencher loop. Of course, both loops considered together constitute a closed loop system.

For those operating conditions when the recycled water generated is less than the quencher make-up water requirement, it is desirable to increase the water content or decrease the solids content in the absorber discharge by directing the low solids stream existing from the separator 26 to mix with the absorber tank discharge slurry in line 56'. At the same time, water may be added to the absorber loop as demister wash water relative to the total fresh make-up water requirement.

As described above, it is necessary to vary the amount of water exiting with the absorber loop discharge solids, that is, the concentration of the discharge slurry, without affecting the solids and chemical balances of the absorber loop. This is done through the use of solid/liquid separating device 26 and controls which may be commercially purchased. This device treats a portion of the absorber loop slurry to generate two streams, a high solids stream and a low solids stream. Either or both of these streams can be combined through one or more lines 54 with an appropriate quantity of untreated absorber loop slurry 56 to produce a stream 56' containing the desired concentration in the slurry flowing into quencher tank 22. With the approach, a wide range of solids content is attainable from the absorber discharge stream.

For those operating conditions (cases 1 and 2) where the sulfur content in the treated gas is high, the high solids stream from the absorber separator is combined with the absorber tank discharge slurry 56 to increase the concentration and reduce the water accompanying the absorber discharge solids. For those operating conditions (case 3) where the sulfur content is less, the slurry concentration is reduced and the water content increased.

Because plant operating conditions, i.e., load factor and $SO_2$ gas content, are constantly varying, the rate of solids generation in the absorber circuit, and the amount of water required to enter the quencher circuit are also changing. To allow the absorber system to react to the process requirements for water versus solids in the slurry a process signal is utilized. This signal relates the $SO_2$ mass flow into the absorber tower, absorber slurry density, or any other process variable which changes with changing $SO_2$ mass flow to the absorber tower to the required concentration of slurry discharge from the absorber loop to the quencher tank. The signal is fed to a controller (not shown) which maintains the concentration of solids discharge to the quencher tank at the desired level. Therefore, with this control scheme, the quencher loop can receive the amount of water from the absorber circuit that it requires under all process operation conditions.

The following examples, designated Cases 1, 2 and 3 for a high, medium and low sulfur containing gas stream will further delineate the present invention.

A comparison of the three cases reveals that the required solids content of stream 56'—SLURRY FEED TO QUENCHER FROM ABSORBER—increases as the $SO_2$ feed rate (expressed here in ppm $SO_2$ in the inlet gas stream) increases. The solids content of stream 56' goes from 8.54% at 750 ppm $SO_2$ to 15.34% at 1500 ppm $SO_2$ to 25.33% at 3000 ppm $SO_2$. Since, for the cases chosen, the absorber tank solids content is 10%, for all cases where the solids content of stream 56' is 40%, the absorber tank overflow stream 56 must combine with a more concentrated stream to produce stream 56'. Accordingly in Case 3, a 5% solids stream from the absorber separator is combined with stream 56 to produce stream 56'; in Case 1 and Case 2, a 40% solids stream from the absorber separator is combined with stream 56 to produce 56'. The absorber separator permits both operations to take place as required. The $SO_2$ mass flow signal 110 determines which operation shall occur. Ranges of stream solids contents is set forth in Table 1.

| STREAMS CASES 1 and 2 |
|---|
| 18a GAS IN |
| 18b GAS |
| 18c GAS OUT |
| 50 REAGENT FEED |
| 34c PRIMARY ABSOBER PUMP SEAL WATER |
| 34b SECONDARY ABSORBER PUMP SEAL WATER |
| 48 DEMISTER WASH WATER |
| 38 PRIMARY ABSORBER FEED |
| 42 SECONDARY ABSORBER FEED |
| 44 ABSORBER SEPARATOR FEED |
| 52 ABSORBER SEPARATOR OVERFLOW |
| 54 ABSORBER SEPARATOR UNDERFLOW |
| 56 ABSORBER TANK OVERFLOW |
| 56' SLURRY FEED TO QUENCHER FROM ABSORBER |
| 34a QUENCHER PUMP SEAL WATER |
| 66 DISPOSAL RETURN WATER |
| 60 QUENCHER FEED |
| 64 DISCHARGE TO DEWATERING SYSTEM |
| 68 DEWATERING SYSTEM BLOWDOWN |
| EL EVAPORATIVE LOSSES |

| ASSUMPTIONS Cases 1 and 2 |
|---|
| (1) Absorber Tower Efficiency = 90% |
|     Quencher Efficiency = 30% |
|     Absorber Efficiency = 85.71% |
| (2) Reagent Utilization = 95% |
| (3) Limestone Purity = 95% |
| (4) No fly ash absorbed into slurry streams |
| (5) Forced oxidation in quencher to 95% mole fraction $CaSO_4 \cdot 2H_2O$ |
| (6) 80% solids blowdown to ultimate disposal (fully closed loop) |

Case 1
High Sulfur (3,000 ppmw) case
Absorber feed to quencher = 25.33% solids

Case 2
Medium Sulfur (1,500 ppmw) case
Absorber feed to quencher - 15.34%

Case 3
Low Sulfur (750 ppmw) case
Absorber feed to quencher - 8,53%

GAS STREAMS
CASE 1
GAS IN - 18a

|  | lb/hr | lb moles/hr | ppm |
|---|---|---|---|
| $N_2$ | 1,207,421 | 43,122 | 767,000 |
| $CO_2$ | 296,852 | 6,747 | 120,000 |
| $O_2$ | 53,973 | 1,687 | 30,000 |
| $SO_2$ | 10,795 | 169 | 3,000 |
| $H_2O$ | 80,959 | 4,497 | 80,000 |
| Total | 1,650,000 | 56,222 | 1,000,000 |
| DENSITY | 0.0550 lb/ft$^3$ | | |
| TEMP | 280° F. | | |
| PRESSURE | 8.0 IWC @ SEA LEVEL | | |
| MW | 29.348 LB/LB MOLE | | |
| ACFM | 500,000 | | |

GAS SATURATED - 18b

|  | lb/hr | lb moles/hr | ppm |
|---|---|---|---|
| $N_2$ | 1,207,421 | 43,122 | 730,447 |
| $CO_2$ | 299,079 | 6,797 | 115,135 |
| $O_2$ | 49,484 | 1,546 | 26,188 |
| $SO_2$ | 7,556.5 | 118.07 | 2,000 |

-continued

| | | | |
|---|---|---|---|
| H₂O | 134,144 | 7,452 | 126,230 |
| Total | 1,697,685 | 59,035 | 1,000,000 |

DENSITY 0.0707 lb/ft³
TEMP 125° F.
PRESSURE 5.0 IWC @ SEA LEVEL
MW 28.757 LB/LB MOLE
ACFM 400,000

GAS OUT - 18c

| | lb/hr | lb moles/hr | ppm |
|---|---|---|---|
| N₂ | 1,207,421 | 43,122 | 732,423 |
| CO₂ | 303,532 | 6,898 | 117,161 |
| O₂ | 44,379 | 1,387 | 23,558 |
| SO₂ | 1,079.5 | 16.87 | 287 |
| H₂O | 134,144 | 7,452 | 126,571 |
| Total | 1,690,556 | 58,876 | 1,000,000 |

DENSITY 0.0701 lb/ft³
TEMP 125° F.
PRESSURE 3.0 IWC @ SEA LEVEL
MW 28.71 LB/LB MOLE
ACFM 401,951

| | | | |
|---|---|---|---|
| Total | 1,639,624 | 56,000 | 1,000,000 |

DENSITY .0547 lb/ft³
TEMP 280° F.
PRESSURE 8.0 IWC @ SEA LEVEL
MW 29.279 lb lb/mole
ACFM 500,000

GAS SATURATED - 18b

| | lb/hr | lb moles/hr | ppm |
|---|---|---|---|
| N₂ | 1,202,656 | 42,952 | 728,460 |
| CO₂ | 296,789 | 6,745 | 114,394 |
| O₂ | 52,655 | 1,645 | 27,899 |
| SO₂ | 3,763.2 | 58.8 | 997 |
| H₂O | 136,120 | 7,562 | 128,250 |
| Total | 1,691,983 | 58,963 | 1,000,000 |

DENSITY .0705 lb/ft³
TEMP 125° F.
PRESSURE 5.0 IWC @ SEA LEVEL
MW 28.696 lb lb/mole
ACFM 400,000

GAS OUT - 18c

LIQUID STREAMS
CASE 1

| | | SOLIDS | | | | | | | |
|---|---|---|---|---|---|---|---|---|---|
| Stream Number | lb/hr CaCO₃ | lb/hr CaSO₃ . ½H₂O | lb/hr CaSO₄ . 2H₂O | lb/hr Inerts | lb/hr Water | lb/hr Total | GPM Total | % Solids | ppm Chlorides |
| 50 | 15,980 | 0 | 0 | 841 | 31,239 | 48,060 | 76 | 35 | 1,000 |
| 34c | 0 | 0 | 0 | 0 | 5,000 | 5,000 | 10 | 0 | 1,000 |
| 34b | 0 | 0 | 0 | 0 | 2,500 | 2,500 | 5 | 0 | 1,000 |
| 48 | 0 | 0 | 0 | 0 | 22,812 | 22,812 | 45 | 0 | 1,000 |
| 38 | 273,759 | 505,427 | 135,525 | 39,289 | 8,586,000 | 9,540,000 | 18,000 | 10 | 1,023 |
| 42 | 114,066 | 210,595 | 56,469 | 16,370 | 3,577,500 | 3,975,000 | 7,500 | 10 | 1,023 |
| 44 | 8,276 | 15,279 | 4,097 | 1,188 | 259,560 | 288,400 | 544 | 10 | 1,023 |
| 52 | 3,547 | 6,548 | 1,756 | 509 | 234,840 | 247,200 | 480 | 5 | 1,023 |
| 54 | 4,729 | 8,731 | 2,341 | 679 | 24,720 | 41,200 | 64 | 40 | 1,023 |
| 56 | 1,131 | 2,088 | 560 | 162 | 35,469 | 39,410 | 72 | 10 | 1,023 |
| 56' | 5,860 | 10,819 | 2,901 | 841 | 60,189 | 80,610 | 136 | 25.33 | 1,023 |
| 34a | 0 | 0 | 0 | 0 | 3,750 | 3,750 | 7.5 | 0 | 9,525 |
| 66 | 0 | 0 | 0 | 0 | 148,547 | 148,547 | 297 | 0 | 9,525 |
| 60 | 23,818 | 29,184 | 739,429 | 25,069 | 4,632,500 | 5,450,000 | 10,000 | 15 | 9,525 |
| 64 | 799 | 979 | 24,805 | 841 | 155,403 | 182,827 | 335 | 15 | 9,525 |
| 68 | 799 | 979 | 24,805 | 841 | 6,856 | 34,280 | 38 | 80 | 9,525 |
| EL | 0 | 0 | 0 | 0 | 53,185 | 53,185 | 106 | 0 | 0 |

GAS STREAMS
CASE 2

GAS IN - 18a

| | lb/hr | lb moles/hr | ppm |
|---|---|---|---|
| N₂ | 1,202,656 | 42,952 | 767,000 |
| CO₂ | 295,680 | 6,720 | 120,000 |
| C₂ | 53,760 | 1,680 | 30,000 |
| SO₂ | 5,376 | 84 | 1,500 |
| H₂O | 82,152 | 4,564 | 81,500 |

| | lb/hr | lb moles/hr | ppm |
|---|---|---|---|
| N₂ | 1,202,656 | 42,952 | 728,499 |
| CO₂ | 299,007 | 6,796 | 115,267 |
| O₂ | 52,521 | 1,641 | 27,833 |
| SO₂ | 537.6 | 8.4 | 142 |
| H₂O | 186,120 | 7,562 | 128,259 |
| Total | 1,690,042 | 58,959 | 1,000,000 |

DENSITY .0701
TEMP 125° F.
PRESSURE 3.0 IWC @ SEA LEVEL
MW 28.618 lb lb/mole
ACFM 401,951

LIQUID STREAMS
CASE 2

| Stream Number | lb/hr CaCO₃ | lb/hr CaSO₃ . ½H₂O | lb/hr CaSO₄ . 2H₂O | lb/hr Inerts | lb/hr Water | lb/hr Total | GPM Total | % Solids | ppm Chlorides |
|---|---|---|---|---|---|---|---|---|---|
| 50 | 7,958 | 0 | 0 | 419 | 15,557 | 23,934 | 38 | 35 | 1,000 |
| 34c | 0 | 0 | 0 | 0 | 5,000 | 5,000 | 10 | 0 | 1,000 |
| 34b | 0 | 0 | 0 | 0 | 2,500 | 2,500 | 5 | 0 | 1,000 |
| 48 | 0 | 0 | 0 | 0 | 33,767 | 33,767 | 67 | 0 | 1,000 |
| 38 | 243,310 | 449,265 | 120,488 | 34,937 | 7,632,000 | 8,480,000 | 16,000 | 10 | 1,012 |
| 42 | 60,828 | 112,316 | 30,122 | 8,734 | 1,908,000 | 2,120,000 | 4,000 | 10 | 1,012 |
| 44 | 2,370 | 4,376 | 1,174 | 340 | 74,340 | 82,600 | 156 | 10 | 1,012 |
| 52 | 1,016 | 1,876 | 503 | 146 | 67,263 | 70,805 | 138 | 5 | 1,012 |

-continued

LIQUID STREAMS CASE 2

| Stream Number | lb/hr CaCO$_3$ | lb/hr CaSO$_3\cdot\frac{1}{2}$H$_2$O | lb/hr CaSO$_4\cdot$2H$_2$O | lb/hr Inerts | lb/hr Water | lb/hr Total | GPM Total | % Solids | ppm Chlorides |
|---|---|---|---|---|---|---|---|---|---|
| 54 | 1,354 | 2,500 | 671 | 194 | 7,077 | 11,795 | 18 | 40 | 1,012 |
| 56 | 1,564 | 2,888 | 774 | 235 | 49,069 | 54,521 | 103 | 10 | 1,012 |
| 56' | 2,918 | 5,388 | 1,445 | 419 | 56,146 | 66,316 | 121 | 15.34 | 1,012 |
| 34a | 0 | 0 | 0 | 0 | 2,500 | 2,500 | 5 | 0 | 1,000 |
| 66 | 0 | 0 | 0 | 0 | 73,980 | 73,980 | 148 | 0 | 16,640 |
| 60 | 19,058 | 23,367 | 591,512 | 20,063 | 3,706,000 | 4,360,000 | 8,000 | 15 | 16,640 |
| 64 | 398 | 488 | 12,353 | 419 | 77,395 | 91,053 | 167 | 15 | 16,640 |
| 68 | 398 | 488 | 12,353 | 419 | 3,415 | 17,073 | 19 | 80 | 16,640 |
| EL | 0 | 0 | 0 | 0 | 53,968 | 53,968 | 108 | 0 | 0 |

GAS STREAMS CASE 3

GAS IN

| | lb/hr | lb moles/hr | ppm |
|---|---|---|---|
| N$_2$ | 1,202,656 | 43,952 | 767,000 |
| CO$_2$ | 295,680 | 6,720 | 120,000 |
| O$_2$ | 53,760 | 1,680 | 30,000 |
| SO$_2$ | 2,688 | 42 | 750 |
| H$_2$O | 82,908 | 4,606 | 82,250 |
| Total | 1,637,292 | 56,000 | 1,000,000 |

DENSITY 0.547 lb/ft$^3$
TEMP 280° F.
PRESSURE 8.0 IWC @ SEA LEVEL
MW 29.237 lb lb/mole
ACFM 500,000

GAS SATURATED

| | lb/hr | lb moles/hr | ppm |
|---|---|---|---|
| N$_2$ | 1,202,656 | 42,952 | 728,000 |
| CO$_2$ | 296,789 | 6,745 | 114,323 |
| O$_2$ | 52,483 | 1,640 | 27,797 |
| SO$_2$ | 1,881.6 | 29.4 | 498 |
| H$_2$O | 137,394 | 7,633 | 129,374 |
| Total | 1,691,204 | 58,999 | 1,000,000 |

DENSITY 0.0705
TEMP 125° F.
PRESSURE 5.0 IWC @ SEA LEVEL
MW 28.665 lb lb/mole
ACFM 400,000

G OUT

| | lb/hr | lb moles/hr | ppm |
|---|---|---|---|
| N$_2$ | 1,202,656 | 42,952 | 728,664 |
| CO$_2$ | 297,343 | 6,752 | 114,545 |
| O$_2$ | 51,370 | 1,605 | 27,228 |
| SO$_2$ | 268.8 | 4.2 | 71 |
| H$_2$O | 137,394 | 7,633 | 129,491 |
| Total | 1,689,032 | 58,946 | 1,000,000 |

DENSITY 0.700
TEMP 125° F.
PRESSURE 3.0 IWC @ SEA LEVEL
MW 28.654 lb lb/mole
ACFM 401,951

LIQUID STREAMS CASE 3

| Stream Number | lb/hr CaCO$_3$ | lb/hr CaSO$_3\cdot\frac{1}{2}$H$_2$O | lb/hr CaSO$_4\cdot$2H$_2$O | lb/hr Inerts | lb/hr Water | lb/hr Total | GPM Total | % Solids | ppm Chlorides |
|---|---|---|---|---|---|---|---|---|---|
| 50 | 3,979 | 0 | 0 | 209 | 7,779 | 11,967 | 19 | 35 | 1,000 |
| 34c | 0 | 0 | 0 | 0 | 5,000 | 5,000 | 10 | 0 | 1,000 |
| 34b | 0 | 0 | 0 | 0 | 2,500 | 2,500 | 5 | 0 | 1,000 |
| 48 | 0 | 0 | 0 | 0 | 39,385 | 39,385 | 79 | 0 | 1,000 |
| 38 | 243,310 | 449,265 | 120,488 | 34,937 | 7,632,000 | 8,400,000 | 16,000 | 10 | 1,046 |
| 42 | 60,828 | 112,316 | 30,122 | 8,734 | 1,908,000 | 2,120,000 | 4,000 | 10 | 1,046 |
| 44 | 585 | 1,082 | 299 | 84 | 18,423 | 20,470 | 38 | 10 | 1,046 |
| 54 | 251 | 466 | 124 | 36 | 16,669 | 17,546 | 34 | 5 | 1,046 |
| 52 | 334 | 616 | 175 | 48 | 1,754 | 2,925 | 4 | 40 | 1,046 |
| 56 | 1,208 | 2,243 | 598 | 173 | 37,118 | 42,217 | 80 | 10 | 1,046 |
| 56' | 1,459 | 2,709 | 722 | 209 | 54,664 | 59,763 | 114 | 8.53 | 1,046 |
| 34a | 0 | 0 | 0 | 0 | 2,500 | 2,500 | 5 | 0 | 1,000 |
| 66 | 0 | 0 | 0 | 0 | 36,990 | 36,990 | 0 | 74 | 33,468 |
| 60 | 19,058 | 23,367 | 591,512 | 20,063 | 3,706,000 | 4,360,000 | 8,000 | 15 | 33,468 |
| 64 | 199 | 244 | 6,177 | 209 | 38,698 | 45,527 | 84 | 15 | 33,468 |
| 68 | 199 | 244 | 6,177 | 209 | 1,708 | 8,537 | 10 | 80 | 33,468 |
| EL | 0 | 0 | 0 | 0 | 54,486 | 54,486 | 109 | 0 | 0 |

TABLE I

Ranges of Stream Solids Contents

| Stream Number | 52 | 54 | 56 | 56' |
|---|---|---|---|---|
| Stream Name | ABSORBER SEPARATOR OVERFLOW | ABSORBER SEPARATOR UNDERFLOW | ABSORBER TANK OVERFLOW | SLURRY FEED TO QUENCHER FROM ABSORBER |
| Range of % Solids | 3–50 | 3–50 | 5–15 | 3–50 |
| Hi Sulfur % Solids (Case 1) | 5 | 40 | 10 | 25.33 |
| Medium Sulfur % Solids | 5 | 40 | 10 | 15.34 |

TABLE I-continued

Ranges of Stream Solids Contents (Case 2)

We claim:

1. A method of operating a two-loop gas stream quencher-scrubber for scrubbing sulfur dioxide from a gas stream comprising the steps:
   (a) quenching in a first loop the gas stream with a first water slurry containing an alkali;
   (b) directing the discharge from the quencher to a quencher liquid storage tank;
   (c) scrubbing in a second loop the quenched gas stream with a second water slurry, isolated from the first water slurry, and containing an alkali in a sulfur dioxide absorber;
   (d) controlling recycled water and selective utilization of high and low solids streams from a separator by:
      1. separating the water slurry discharged from the gas sulfur dioxide absorber into a low solids overflow stream and a high solids underflow stream in a liquid-solids concentrator;
      2. directing the high solids portion of the scrubbing slurry to the quencher liquid storage tank;
      3. continuously dewatering a portion of the quencher slurry from the quencher liquid storage tank; and
      4. disposing of the solids from the dewatering step while returning the water to the quencher liquid storage tank.

2. The method defined in claim 1 wherein the scrubbed gas stream is passed through a demister; the demister is washed with water and the wash water from the demister is added to the discharge liquid from the scrubber in the second loop.

3. The method defined in claim 2 including directing the low solids overflow stream and step (d) to a scrubbing liquid holding tank; and as needed, adding water and an alkali reagent to said holding tank.

4. The method defined in claim 3 wherein the alkali reagent is lime or limestone.

5. The method defined in claim 1 wherein the solids content of the water slurry in the sulfur dioxide absorber is maintained between about 6% to 14% solid content.

6. The method defined in claim 1 wherein the high solids stream from the separation step has a solids content in the range of 10% to 50% and the low solids stream has a solids content in the range of 3% to 10%.

7. The method defined in claim 1 wherein the alkali solids comprise $CaCO_3$ and the solids disposed of in step (4) are primarily calcium sulfate.

8. The method defined in claim 4 wherein the high solids stream from step (d) is primarily water and calcium carbonate.

9. The method defined in claim 4 wherein the high solids underflow stream is primarily water, calcium sulfite and calcium sulfate.

10. A method of operating a two-loop gas stream quench-scrubber for scrubbing sulfur dioxide from a gas stream comprising the steps of:
    (a) quenching in a first loop the gas stream with a first water slurry containing alkali solids;
    (b) scrubbing in a second loop the quenched gas stream with a second water slurry, isolated from the first water slurry, and containing alkali solids;
    (c) maintaining the alkali solids content in the scrubbing slurry at a level between 6% to 15% relative to the sulfur dioxide content in the gas stream by adding alkali solids and water as required;
    (d) maintaining the alkali solids content in the quenching slurry at a level greater than 3% relative to the sulfur dioxide content in the gas stream by selectively withdrawing from the scrubbing slurry portions having higher or lower alkali solids content than said level, thereby raising or lowering the alkali solids content in the quenching slurry.

11. The method as defined in claim 10 wherein the alkali solids comprise $CaCO_3$ and fresh water and concentrated slurry of the alkali solids are introduced into the scrubbing slurry and cycled slurry is withdrawn from the scrubbing slurry and introduced into the quenching slurry to avoid buildup of dissolved calcium sulfate compounds in the scrubbing slurry and to provide a substantially open first loop.

12. The method as defined in claim 11 wherein a portion of the said first slurry is withdrawn and water is extracted from said withdrawn slurry and returned to said first slurry.

13. The method as defined in claim 11 wherein slurry is continuously fed from the scrubbing slurry to the quenching slurry to partially substitute for the slurry lost in the quenching process.

14. The method as defined in claim 13 wherein a portion of the quenching slurry is withdrawn and dewatered and the water is returned to the quenching slurry while the solids are discarded.

15. The method as defined in claim 14 wherein the quenching slurry and the scrubbing are circulated in separate scrubbing loop and quencher loop systems.

16. The method as defined in claim 11 wherein the quantity of water added to both the scrubbing loop and the quencher loop is controlled by selectively withdrawing slurry portions from the scrubbing slurry loop having a higher alkali solids content and returning slurry portions to the scrubbing slurry loop having a lower alkali solids content thereby reducing the amount of water required to be added to the scrubbing loop to maintain the solids content at a desired level, and increasing the amount of water added to the scrubbing loop by withdrawing slurry portions having lower alkali solids content and returning slurry portions having higher alkali solids content.

17. The method as defined in claim 16 wherein the alkali solids content in the scrubbing slurry is maintained within the range of 3% to 10%, and the content in the quencher slurry is maintained within the range of 10% to 50%.

18. The method as defined in claim 17 wherein the scrubbing of the gas stream occurs in a closed vessel in which the gas enters from the bottom and exits from the top and the quenching slurry is sprayed into the gas stream near the bottom of the vessel and the absorber slurry is sprayed into the gas stream near the top of the vessel and each sprayed slurry is collected separately.

19. The method as defined in claim 18 wherein water is sprayed into the gas stream in the vessel above the scrubbing spray and the sprayed water is collected with the scrubbing slurry.

20. A method of operating a two-loop gas stream quencher-scrubber for scrubbing sulfur dioxide from a gas stream comprising the steps:

(a) passing the gas stream through a vessel from the bottom and out the top in which are located lower level quencher sprays, middle level scrubbing sprays and upper level demister sprays;

(b) quenching the gas stream with a first water slurry containing $CaCO_3$ solids and collecting the quenching slurry in a first separate loop system;

(c) scrubbing the quenched gas stream with a second water slurry containing $CaCO_3$ solids and collecting the scrubbing slurry in a second separate loop system isolated from the first loop system;

(d) spraying fresh water into the gas stream adjacent the top of the vessel and collecting the water with the quenching slurry;

(e) maintaining the $CaCO_3$ solids content in the scrubbing slurry at a level between 3% and 10% relative to the sulfur dioxide content in the gas stream by adding concentrated slurry of $CaCO_3$ solids as required;

(f) continuously withdrawing a portion of the circulated absorber slurry to avoid buildup of dissolved calcium sulfate compounds in the second loop system and introducing such withdrawn portion into the first slurry loop;

(g) withdrawing a portion of the quencher slurry, removing the solids from such withdrawn portion and returning the remaining water to the first slurry loop thereby defining a substantially closed loop system; and (h) maintaining the $CaCO_3$ solids content in the quencher slurry at a level greater than 3% relative to the sulfur dioxide content in the gas stream by selectively withdrawing scrubbing slurry portion having higher or lower $CaCO_3$ solids content from the second loop system thereby raising or lowering the $CaCO_3$ solids content in the quenching slurry.

* * * * *

UNITED STATES PATENT AND TRADEMARK OFFICE
CERTIFICATE OF CORRECTION

PATENT NO. : 4,322,392
DATED : March 30, 1982
INVENTOR(S) : Robert J. Gleason et al.

It is certified that error appears in the above-identified patent and that said Letters Patent are hereby corrected as shown below:

Claim 3, line 2, "and" should read -- from --.

Claim 15, line 2, after "scrubbing" insert -- slurry -- .

Claim 20 (h) line 4, "portion" should read -- portions --.

Signed and Sealed this

Eighteenth Day of May 1982

[SEAL]

Attest:

Attesting Officer

GERALD J. MOSSINGHOFF
Commissioner of Patents and Trademarks